(12) United States Patent
Liao

(10) Patent No.: US 9,176,269 B2
(45) Date of Patent: Nov. 3, 2015

(54) LIGHT SOURCE MODULE AND DISPLAY MODULE

(71) Applicant: Au Optronics Corporation, Hsinchu (TW)

(72) Inventor: Super Liao, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/166,860

(22) Filed: Jan. 29, 2014

(65) Prior Publication Data

US 2014/0146568 A1    May 29, 2014

Related U.S. Application Data

(63) Continuation of application No. 12/564,052, filed on Sep. 22, 2009, now abandoned.

(30) Foreign Application Priority Data

Jul. 23, 2009    (TW) ................ 98124889 A

(51) Int. Cl.
*F21V 7/04* (2006.01)
*F21V 8/00* (2006.01)

(52) U.S. Cl.
CPC ............ *G02B 6/0011* (2013.01); *G02B 6/0061* (2013.01); *G02B 6/002* (2013.01); *G02B 6/0038* (2013.01)

(58) Field of Classification Search
CPC .. G02B 6/0011; G02B 6/0016; G02B 6/0018; G02B 6/002; G02B 6/0036; G02B 6/0038; G02B 6/0061
USPC ..................... 362/617–626; 349/65
See application file for complete search history.

(56) References Cited

U.S. PATENT DOCUMENTS 5,997,148 A * 12/1999 Ohkawa ................ 362/619

* cited by examiner

*Primary Examiner* — Jason Moon Han
(74) *Attorney, Agent, or Firm* — Jianq Chyun IP Office

(57) ABSTRACT

A light source module including a light guide plate and a light source is provided. The light guide plate has a light incident surface and a light emitting region, and the light guide plate has a plurality of grooves or protruding patterns thereon. The length of the grooves or the protruding patterns is smaller than the length of the light guide plate. The light source is disposed on the light incident surface of the light guide plate, and the grooves or the protruding patterns of the light guide plate are disposed beside the light incident surface.

16 Claims, 14 Drawing Sheets

LIGHT SOURCE MODULE AND DISPLAY MODULE

CROSS-REFERENCE TO RELATED APPLICATION

This is a continuation application of and claims the priority benefit of U.S. application Ser. No. 12/564,052, filed on Sep. 22, 2009, now pending, which claims the priority benefit of Taiwan application serial no. 98124889, filed on Jul. 23, 2009. The entirety of each of the above-mentioned patent applications is hereby incorporated by reference herein and made a part of this specification.

BACKGROUND OF THE INVENTION

1. Field of the Invention

The invention generally relates to a light source module and a display module, and more particularly to a side incident type light source module and a display module having the side incident type light source module.

2. Description of Related Art

The main components of a liquid crystal display (LCD) apparatus includes an LCD panel and a backlight module, in which the LCD panel is formed by two substrates and a liquid crystal layer disposed between the two substrates, and the backlight module is used for providing the required light source for the LCD apparatus to display images.

Typically, the backlight module is divided into a direct type and a side incident type. The direct type backlight module is usually applied to large-sized LCDs, whereas the side incident type backlight module is usually adopted in small-sized LCDs.

FIG. 1 represents a schematic view illustrating a conventional side incident type backlight module. Referring to FIG. 1, a conventional side incident type backlight module 100 includes a light guide plate 110, a light source 120, an optical film set 130, and a reflector 140, in which the light source 120 is disposed on a side of the light guide plate 110, and the optical film set 130 and the reflector 140 are respectively disposed above and below the light guide plate 110. In order to improve the brightness performance of the side incident type backlight module 100, conventionally a light guide plate 110 having V-grooves is used. The V-grooves of the light guide plate 110 are disposed on an entire light incident surface 110a, meaning that the length of the of the V-grooves and the length of the light guide plate 110 are the same. After a light emitted from the light source 120 enters the light guide plate 110, the light is reflected by a reflector 140 on a bottom surface 110b of the light guide plate 110. By using the V-grooves to refract the light, the front emitted luminance and the light source efficiency are improved, thereby generating a planar light source having enhanced brightness.

FIG. 2 represents a schematic view illustrating another conventional side incident type backlight module. Referring to FIG. 2, a side incident type backlight module 200 depicted in FIG. 2 is similar to the side incident type backlight module 100. The differences are: the V-grooves of a light guide plate 210 of the side incident type backlight module 200 depicted in FIG. 2 are disposed on an entire bottom surface 210b, the light emitted from a light source 220 enters the light guide plate 210, the light paths are guided directly upward by a reflector 240 disposed beneath a bottom surface 210b of the light guide plate 210, and the V-grooves are used for increasing the brightness of the front emitted light.

It should be noted that whether the V-grooves are disposed on the light emitting surface 110a of the light guide plate 110 or disposed on the bottom surface 210b of the light guide plate 210, when the side incident type backlight modules 100 and 200 are assembled or transported, the V-grooves may collide or cause friction with the optical film set 130 disposed above the light guide plate 110 or the reflector 240 disposed below the light guide plate 210, thereby damaging the V-grooves and forming a plurality of hot spots. Consequently, not only is the display quality of the LCD apparatus compromised, the production costs are increased because extra optical films are needed to solve the hot spot issue.

SUMMARY OF THE INVENTION

A light source module is provided, for reducing the hot spots generated during assembly or transport due to collisions of the light guide plate, thereby increasing yield and decreasing production costs.

A display module having a favorable display quality is also provided.

A light source module including a light guide plate and a light source is provided. The light guide plate has a light incident surface and a light emitting region, and the light guide plate has a plurality of grooves or a plurality of protruding patterns thereon, in which the length of the grooves or the protruding patterns is smaller than the length of the light guide plate. The light source is disposed on the light incident surface of the light guide plate, and the grooves or the protruding patterns of the light guide plate are disposed besides the light incident surface.

A display module including a display panel and a light source module is provided. The light source module is disposed on a side of the display panel, in which the light source module includes a light guide plate and a light source. The light guide plate has a light incident surface and a light emitting region, and the light guide plate has a plurality of grooves or a plurality of protruding patterns thereon, in which the length of the grooves or the protruding patterns is smaller than the length of the light guide plate. The light source is disposed on the light incident surface of the light guide plate, and the grooves or the protruding patterns of the light guide plate are disposed besides the light incident surface.

In summary, since the length of the grooves or the protruding patterns on the light guide plate is smaller than the length of the light guide plate, during assembly or transport of the light source module, the grooves or the protruding patterns on the light guide plate can decrease the area for which the light guide plate may collide or cause friction with other components (such as an optical film set disposed above the light guide plate or a reflector disposed below the light guide plate). Consequently, the light source module can provide a more favorable planar light source, thereby improving the display quality of the display module, improving the yield of the light source module and the display module, and decreasing production costs.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
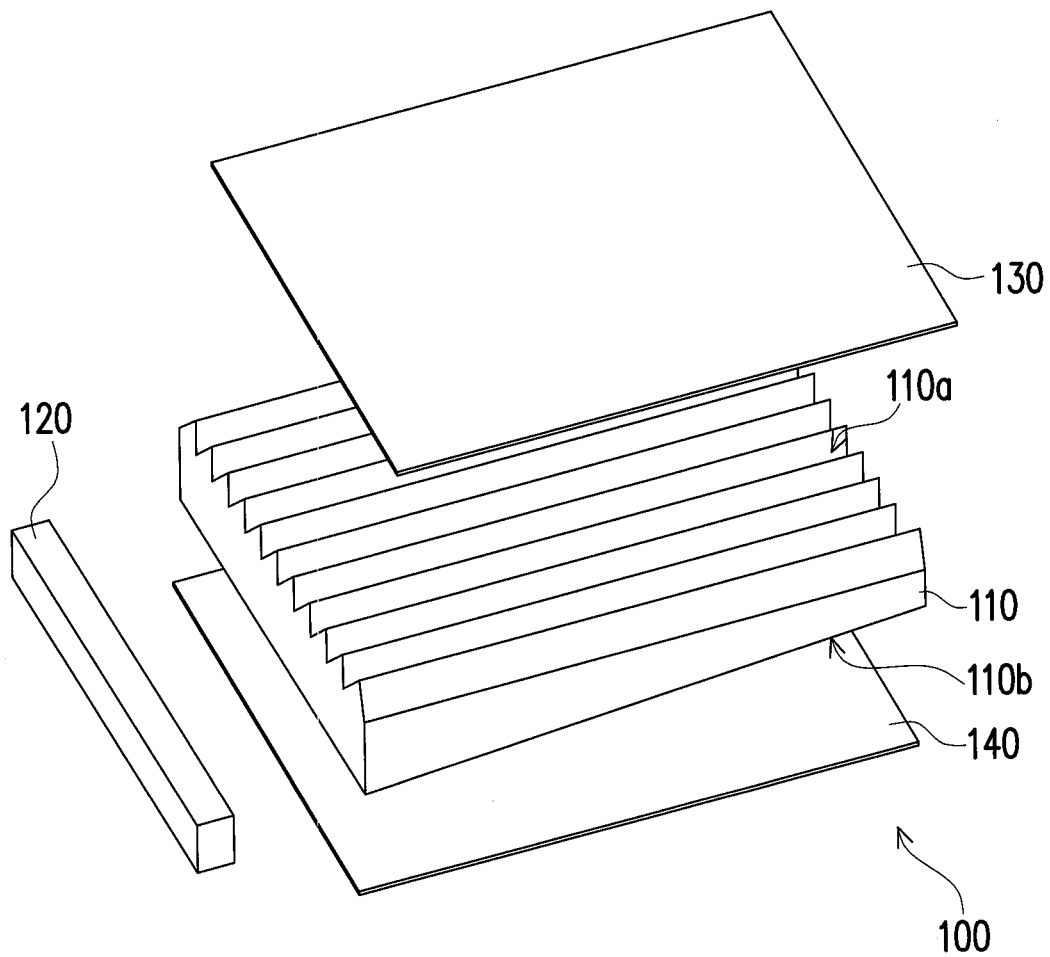
FIG. 1 represents a schematic view illustrating a conventional side incident type backlight module.
Figure 2:
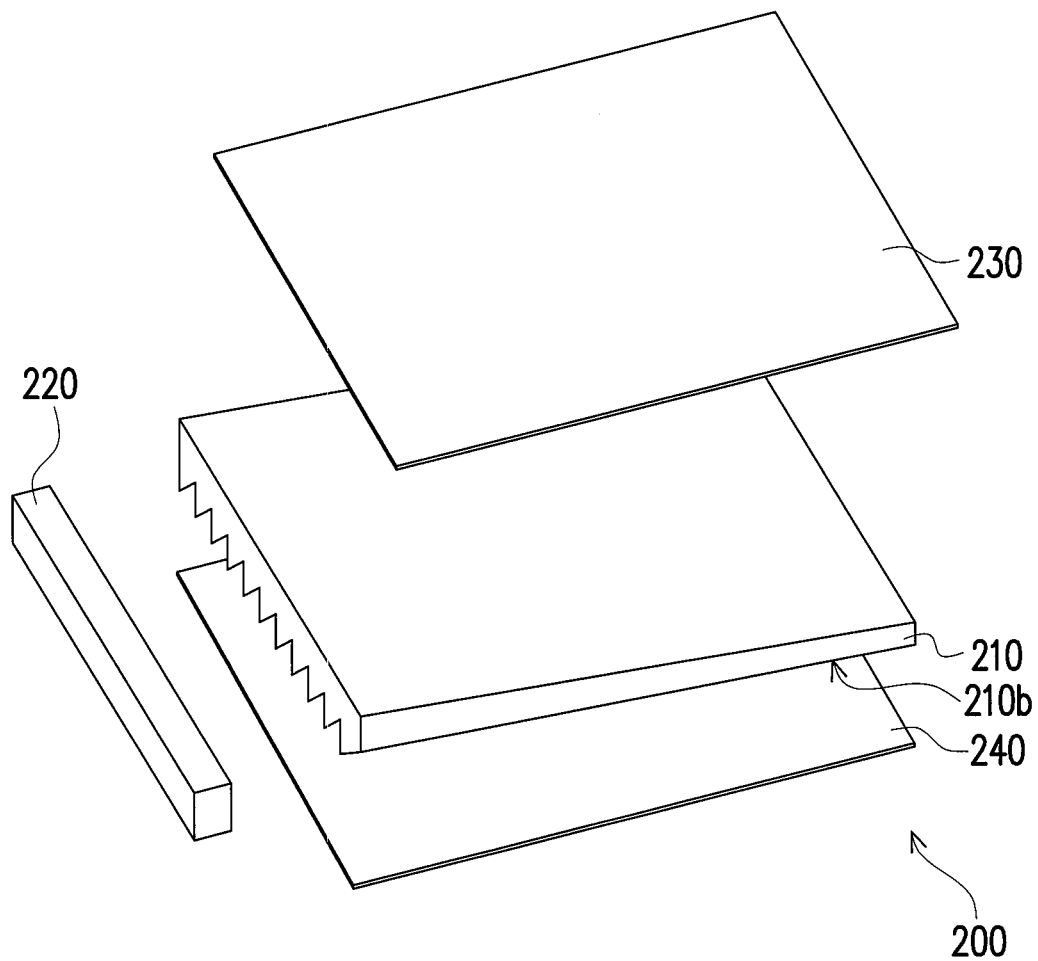
FIG. 2 represents a schematic view illustrating another conventional side incident type backlight module.
Figure 3:
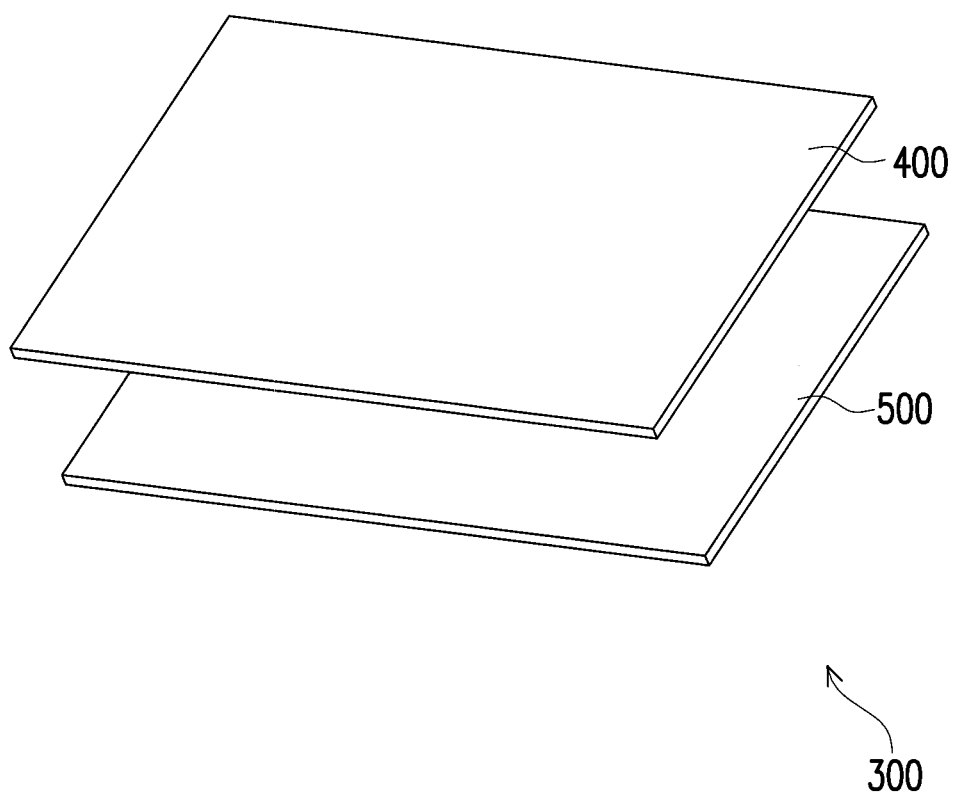
FIG. 3 represents a schematic diagram illustrating a display module in accordance with one embodiment of the invention.
Figure 4A:
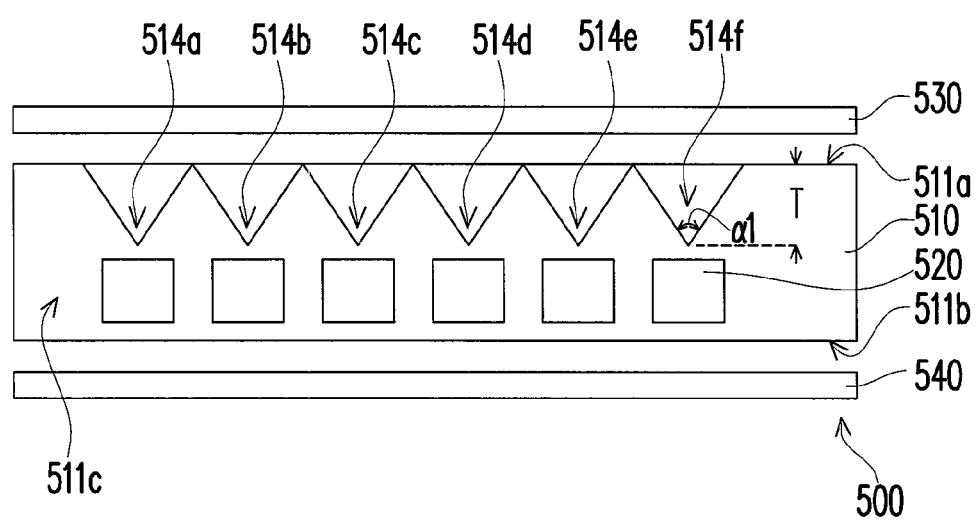
FIG. 4A represents a schematic side view of a backlight module of the display module depicted in FIG. 3.

FIG. 3 represents a schematic diagram illustrating a display module in accordance with one embodiment of the invention. FIG. 4A represents a schematic side views of a backlight module of the display module depicted in FIG. 3. Referring concurrently to FIGS. 3 and 4A, a display module 300 includes a display panel 400 and a light source module 500, in which the light source module 500 is disposed on a side of the display panel 400, for example below the display panel 400. The light source module 500 includes a light guide plate 510 and a light source 520. For example, the light source 520 can be a plurality of point light sources disposed on at least one side of the light guide plate 510, and the point light sources can be formed by a plurality of light emitting diodes (LEDs) for providing light. However, the invention is not limited thereto. In other embodiments of the invention, the light source 520 can be other types of light sources. Typically, light emitted from the light source 520 are guided by the light guide plate 510 and transmitted so that the light source module 500 can provide a planar light source having for example, uniform brightness for use by the display panel 400. In the present embodiment of the invention, the light source module can be a side incident type backlight module, and the display module can be a LCD module.

Figure 4B:
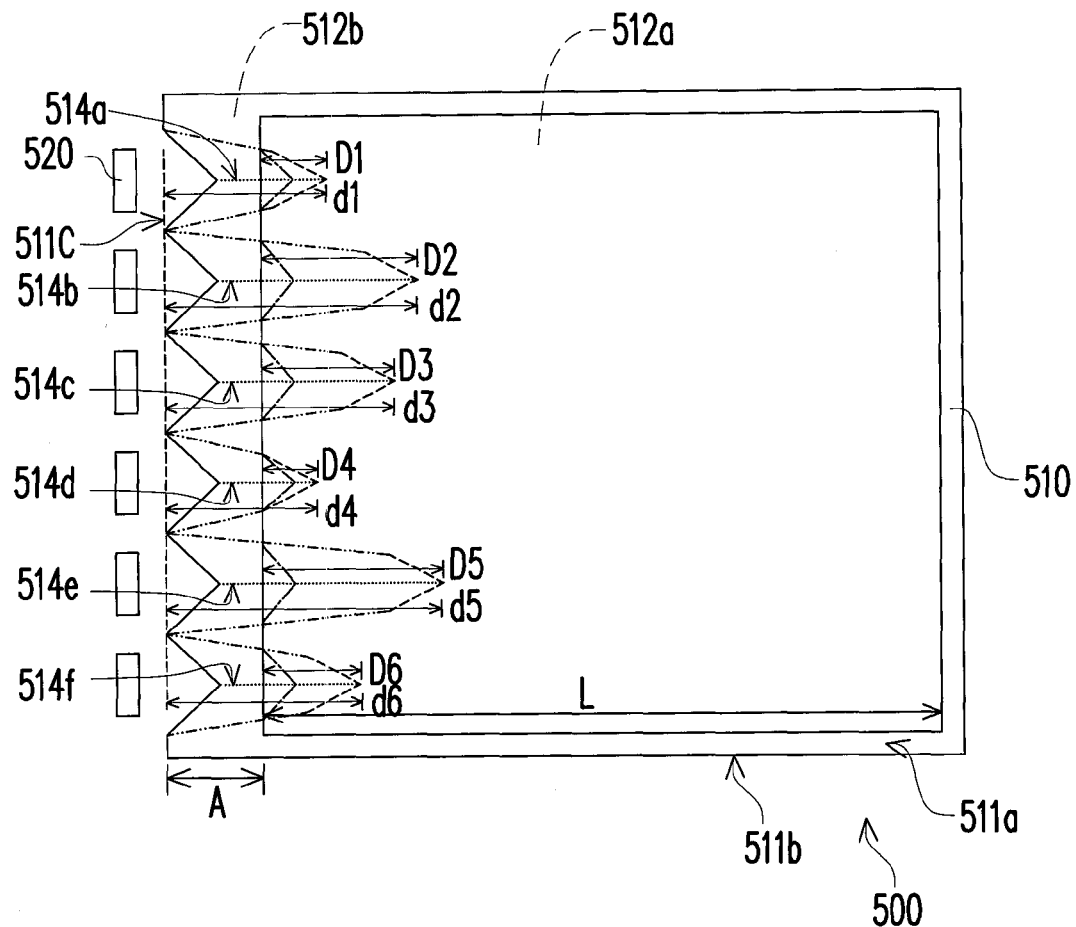
FIG. 4B represents a schematic top view of the light source module depicted in FIG. 4A.

FIG. 4B represents a schematic top view of the light source module depicted in FIG. 4A. Referring concurrently to FIGS. 4A and 4B, the light guide plate 510 is mainly used to convert the light source 520 into a planar light source transmitting uniform light so that the display panel 400 is provided with the required backlight module light source for display. In the present embodiment of the invention, the light guide plate 510 has an upper surface 511a, a lower surface 511b corresponding to the upper surface 511a, a light incident surface 511c, a light emitting region 512a, and a periphery region 512b around the light emitting region 512a. The light guide plate 510 has a plurality of grooves 514a~514f, and the length of the grooves 514a~514f is smaller than the length of the light guide plate 510. More specifically, the light emitting region 512a has a length L, and the lengths of the grooves 514a~514f in the light emitting region are D1~D6, respectively. $0<D1~D6<\frac{1}{4}L$ is more preferable, although the invention is not limited thereto. Additionally, the length of the periphery region 512b is A, and the lengths of the grooves are d1~d6, respectively. $A<d1~d6<A+\frac{1}{4}L$ is more preferable, although the invention is not limited thereto. The light source 520 is disposed on a light incident surface 511c of the light guide plate 510, and the grooves 514a~514f of the light guide plate 510 are disposed besides the light incident surface 511c.

Figure 4D:
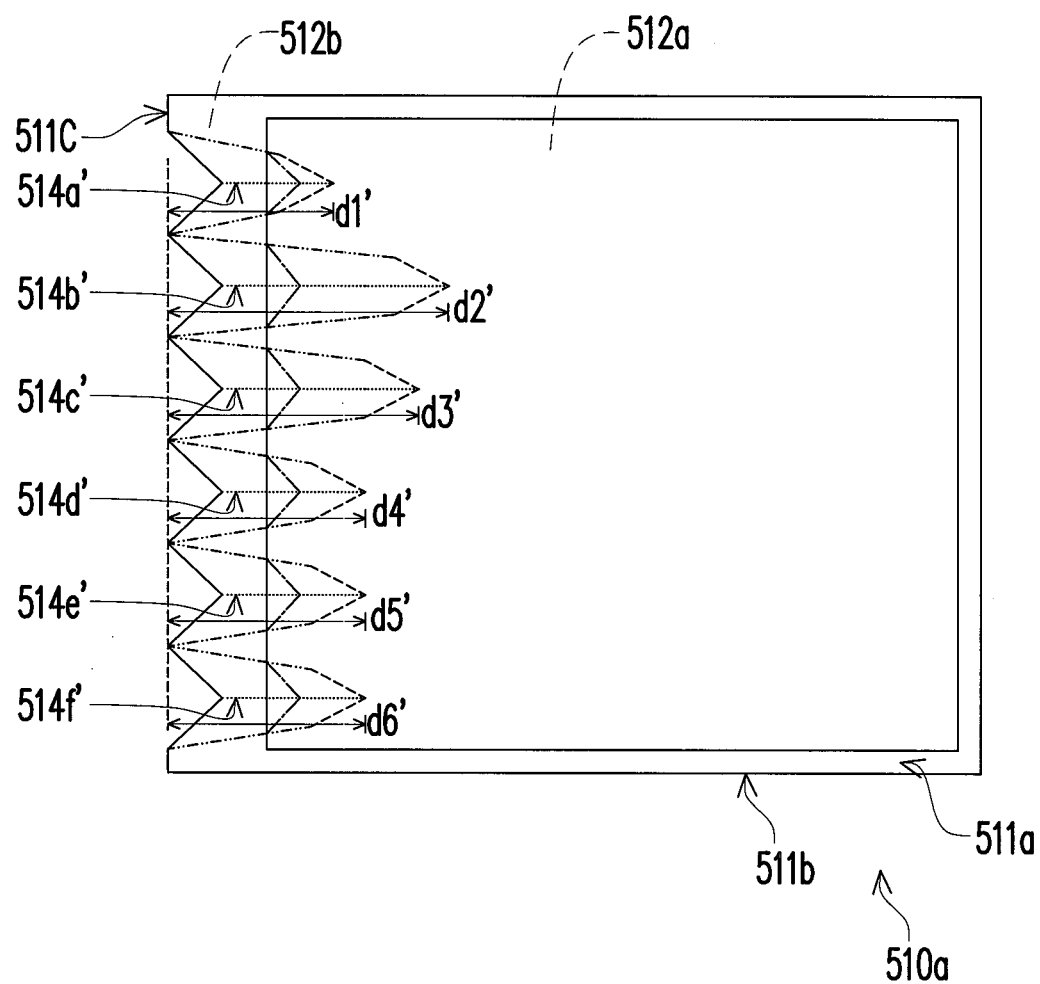
FIG. 4D represents a schematic top view of the light guide plate in accordance with another embodiment of the invention.
Figure 5A:
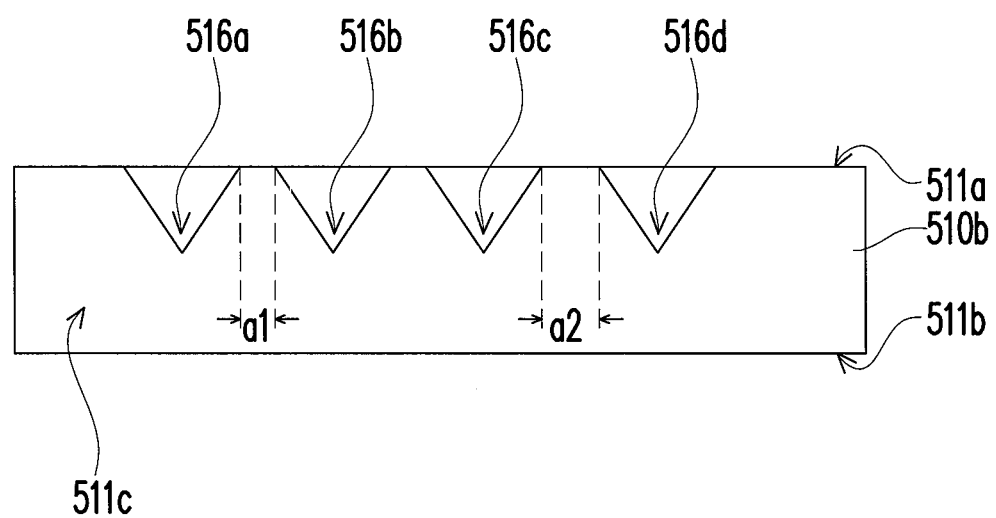
FIG. 5A represents a schematic side view of the light guide plate in accordance with another embodiment of the invention.
Figure 5B:
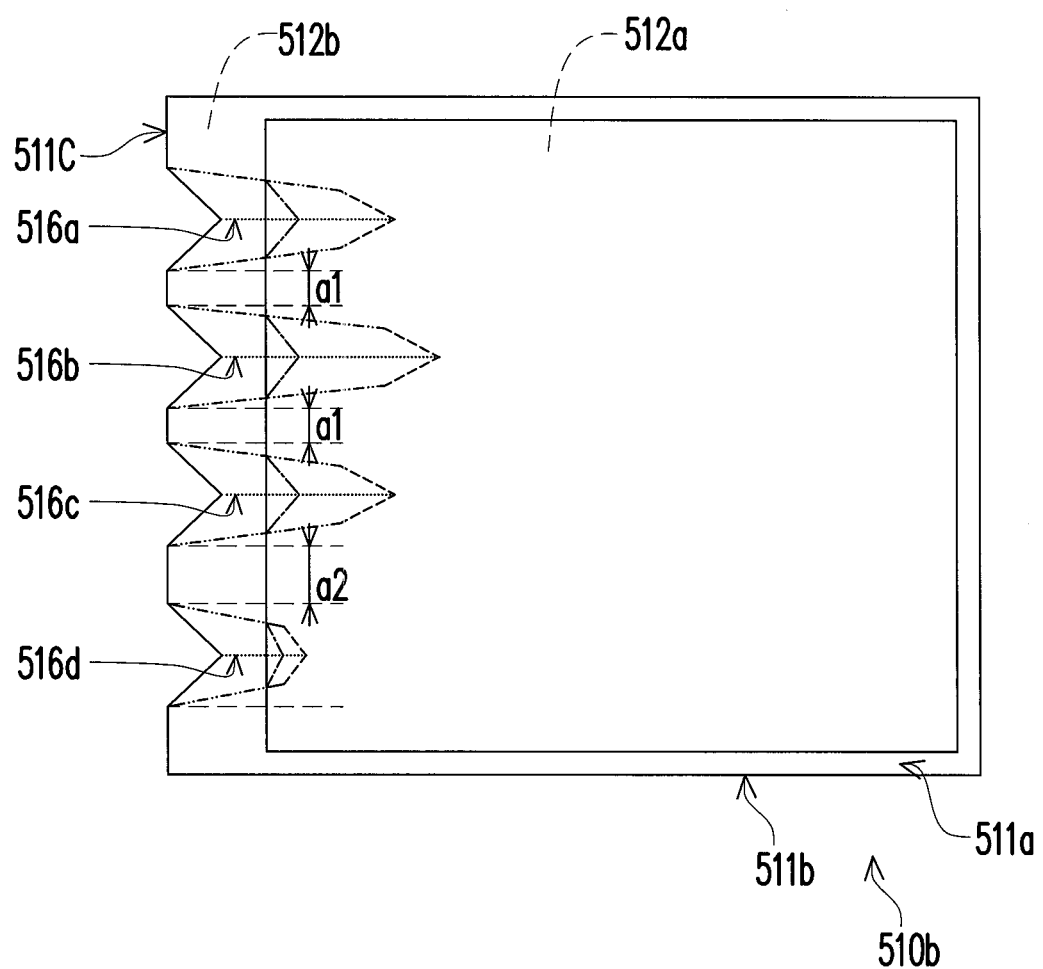
FIG. 5B represents a schematic top view of the light guide plate depicted in FIG. 5A.

In the design of the light guide plate 510 according to the present embodiment of the invention, the grooves 514a~514f are disposed on the upper surface 511a of the light guide plate 510. Moreover, the grooves 514a~514f are extending in a direction from the light incident surface 511c towards the light emitting region 512a and across the periphery region 512b. Additionally, since adjacent grooves of the grooves 514a~514f are connected to each other, there is no space between two opposing sidewalls of the grooves 514a~514f. The directions of extension for the grooves 514a~514f are parallel to each other, and the lengths of the extensions are not all the same. Therefore, the lengths of the grooves 514a~514f can be entirely different from each other, as shown in FIG. 4B where the lengths d1~d6 of the grooves 514a~514f are different from each other. Alternatively, the lengths of the grooves 514a~514f can be partially different, as shown in a light guide plate 510a depicted in FIG. 4D where the lengths d1'~d3' of the grooves 514a'~514c' are different from each other, but the lengths d4'~d6' of the grooves 514d'~514f' are the same. In other words, the lengths d4'~d6' of the grooves 514d'~514f' are not entirely the same. As shown in FIGS. 5A~5B, in another embodiment of the invention, adjacent grooves of the grooves 516a~516d on a light guide plate 510b can also be disconnected from each other. That is to say, a spacing distance exists between the sidewalls of the adjacent grooves 516a~516d. For example, the sidewalls of the grooves 516a and 516b are spaced apart from each other at a first distance a1, whereas the sidewalls of the grooves 516c and 516d are spaced apart from each other at a second distance a2, and the first distance a1 is substantially different from the second distance a2. It should be noted that in other embodiments of the invention undrawn in this description, the first distance a1 can be substantially the same as the second distance a2.

Figure 4C:
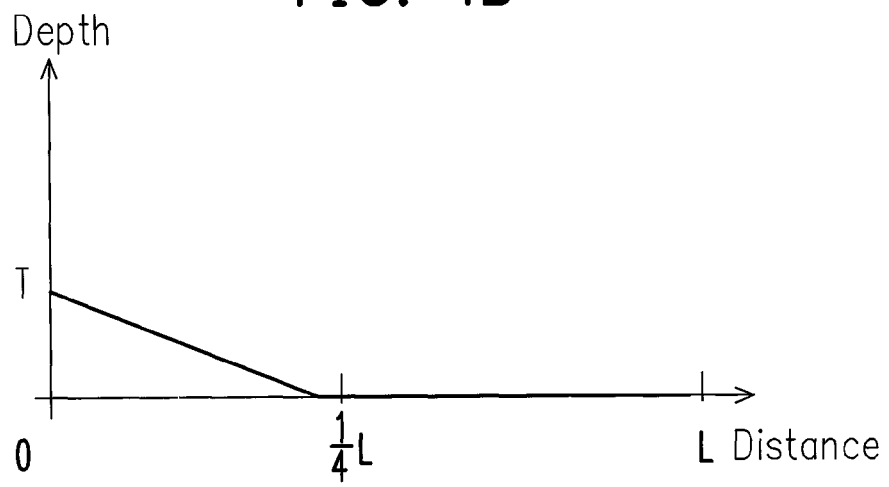
FIG. 4C represents a schematic diagram illustrating a relationship between the depth of the grooves on the light guide plate depicted in FIG. 4A and the length of the light emitting region.
Figure 6A:
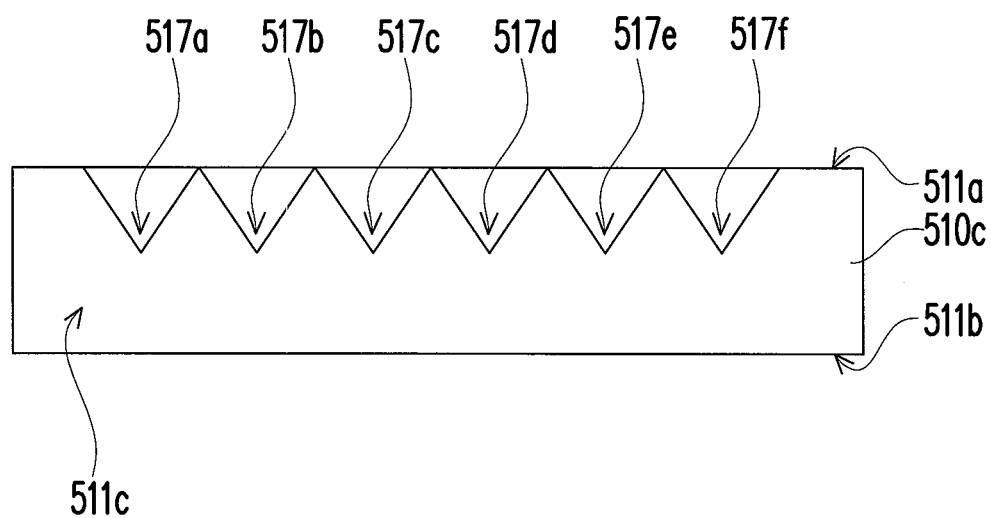
FIG. 6A represents a schematic side view of the light guide plate in accordance with another embodiment of the invention.
Figure 6B:
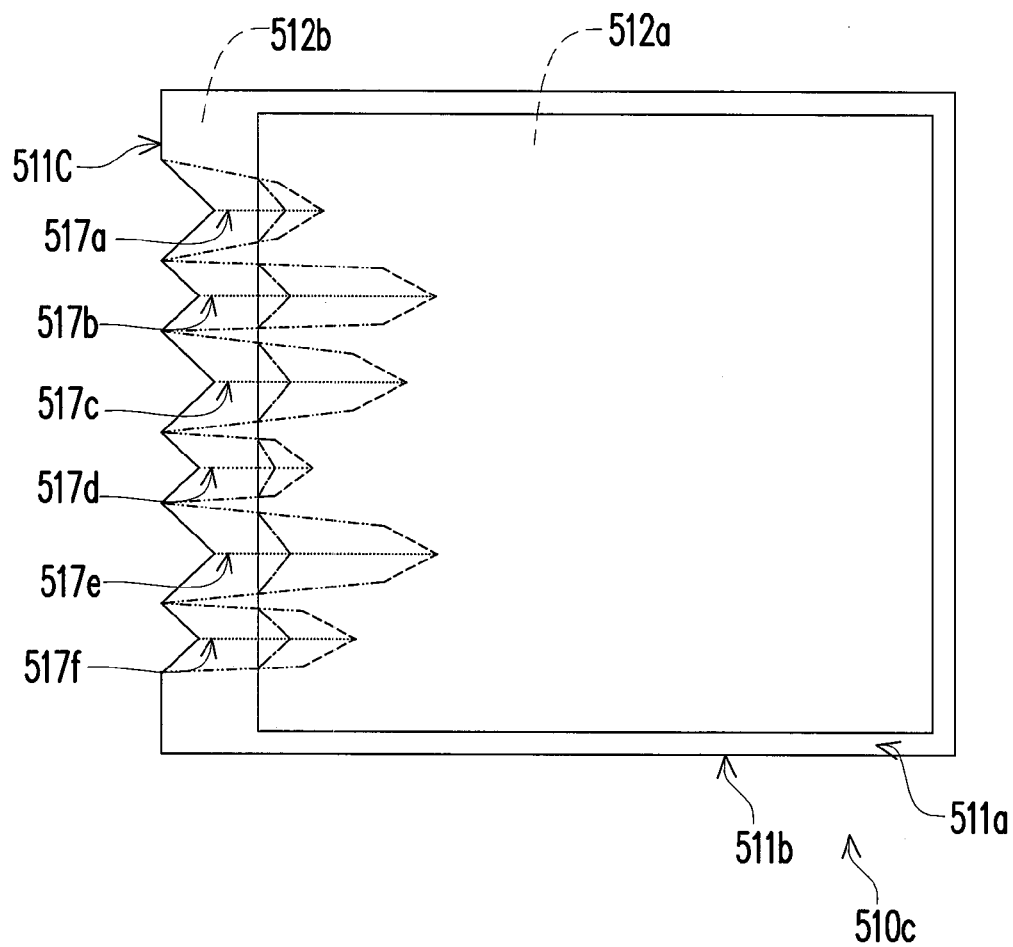
FIG. 6B represents a schematic top view of the light guide plate depicted in FIG. 6A.
Figure 6C:
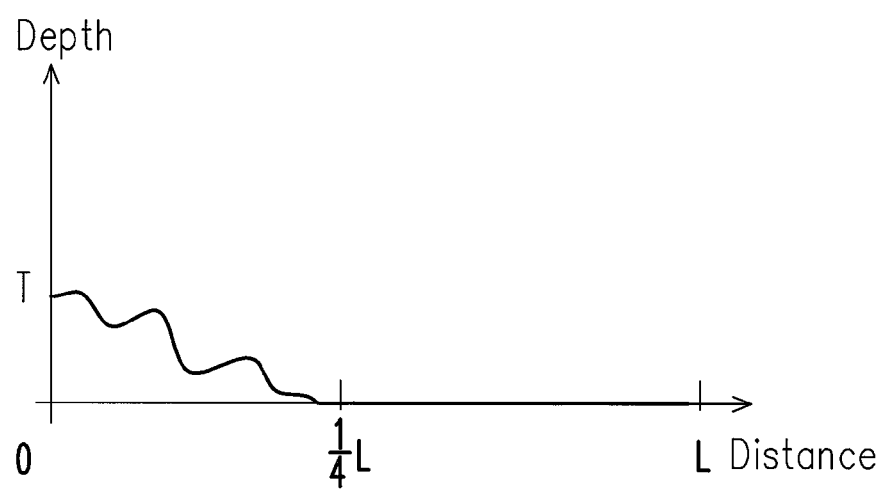
FIG. 6C represents a schematic diagram illustrating the relationship between the depth of the grooves on the light guide plate depicted in FIG. 6A and the length of the light emitting region.
Figure 7A:
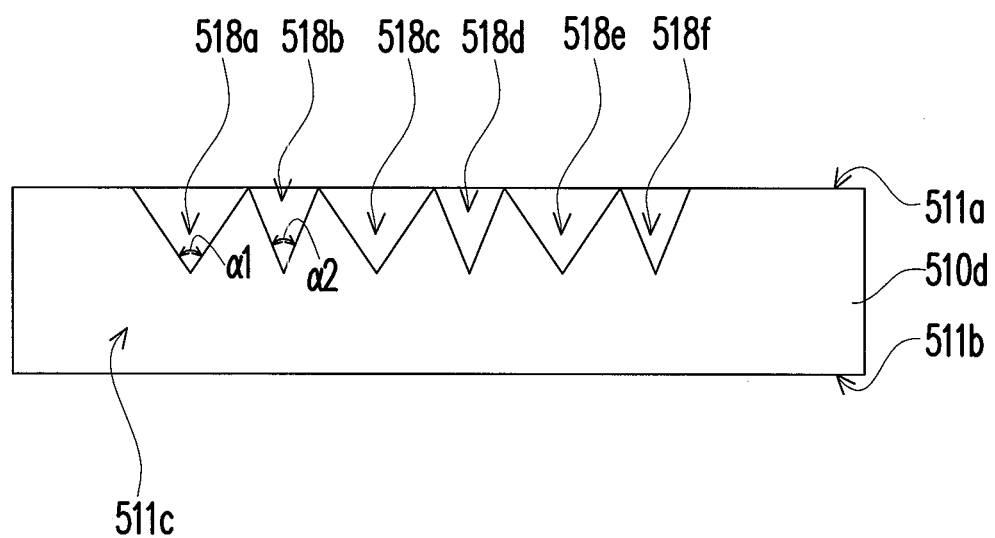
FIG. 7A represents a schematic side view of the light guide plate in accordance with another embodiment of the invention.
Figure 7B:
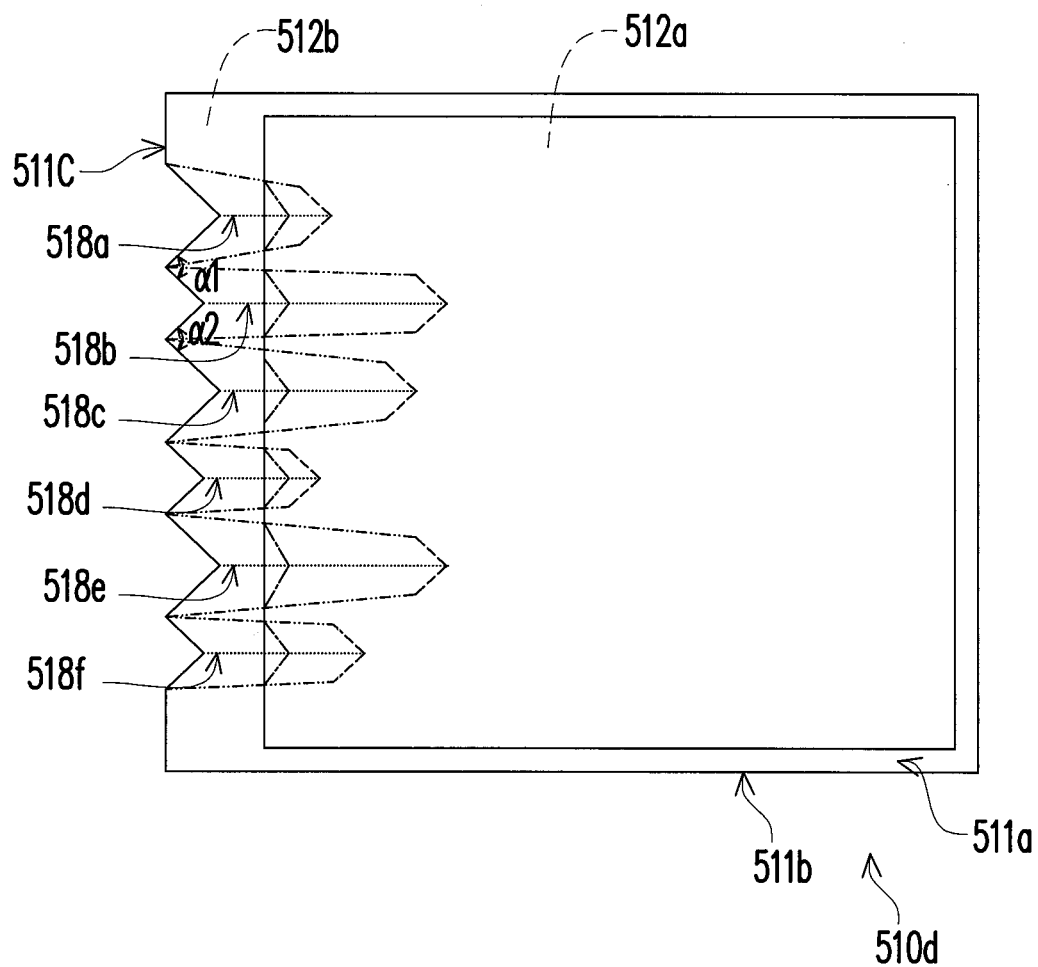
FIG. 7B represents a schematic top view of the light guide plate depicted in FIG. 7A.

FIG. 4C represents a schematic diagram illustrating a relationship between the depth of the grooves on the light guide plate depicted in FIG. 4A and the length of the light emitting region. Referring concurrently to FIGS. 4A~4C, the depth (or the height) of the grooves 514a~514f in the light emitting region is shallower than the depth (or the height) of the grooves 514a~514f in the periphery region 512b. The depth (or the height) of the grooves 514a~514f decreases in a linear manner, therefore the depth (or the height) of the grooves 514a~514f decreases proportionally until smaller than ¼L at the light emitting region 512a (where L is the length of the light emitting region 512a). The longitudinal sections of the grooves 514a~514f are V-shaped, for example, and the longitudinal sections of the grooves 514a'~514f' have the same angle α. As shown in FIGS. 6A~6C, in another embodiment of the invention, the depth (or height) of the grooves 517a~517f can also be decreasing in a nonlinear manner, meaning that the depth (or height) of the grooves 517a~517f is decreasing irregularly, and the depth (or height) of the grooves 517a~517f is not decreasing proportionally from the periphery region 512b towards the light emitting region 512a. In other words, the depth (or height) of the grooves 517a~517f can change in different manners. Moreover, in another embodiment of the invention shown in FIGS. 7A and 7B, the longitudinal section of a plurality of grooves 518a~518f of a light guide plate 510d has at least one included angle, meaning that each set of two opposing sidewalls of the grooves 518a~518f has a different tilt angle. For example, the included angle between the two opposing sidewalls of the groove 518a can be α1, and the included angle between the two opposing sidewalls of the groove 518b can be α2, in which the included angle α1 and the included angle α2 is different from each other.

Figure 8:
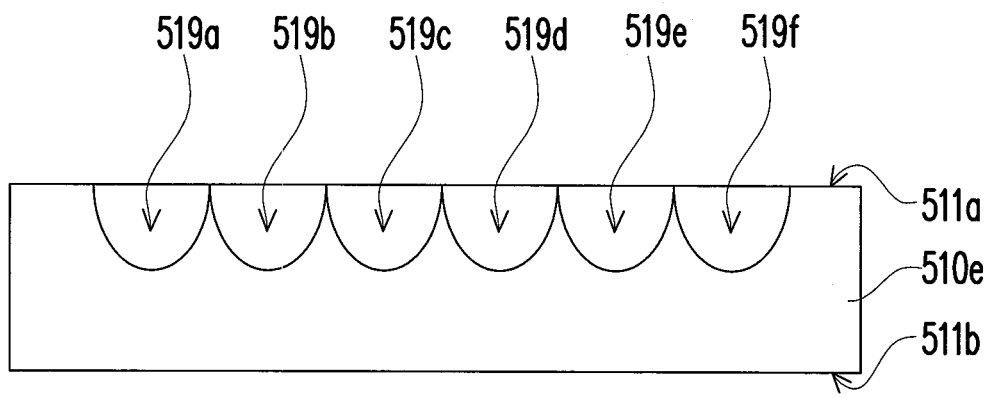
FIG. 8 represents a schematic side view of the light guide plate in accordance with another embodiment of the invention.
Figure 9:
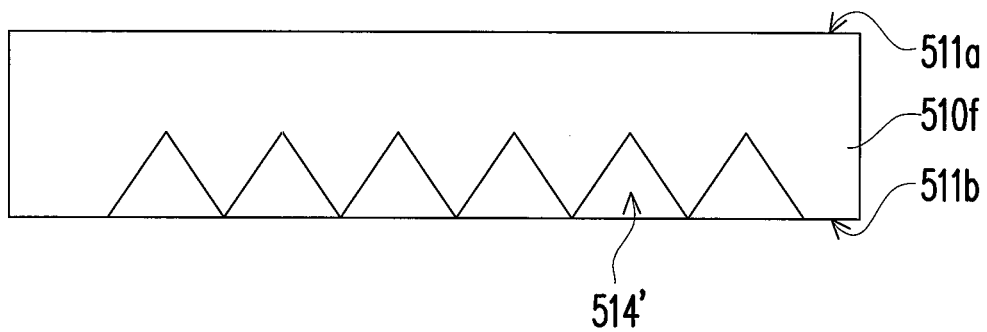
FIG. 9 represents a schematic side view of the light guide plate in accordance with another embodiment of the invention.

It should be noted that, embodiments of the invention are not limited by the position or the type of the grooves 514a~514f (or the grooves 514a'~514f', the grooves 516a~516d, the grooves 517a~517f, the grooves 518a~518f) of the light guide plate 510 (or the light guide plates 510a~510d). Even though the grooves 514a~514f (or the grooves 514a'~514f', the grooves 516a~516d, the grooves 517a~517f, the grooves 518a~518f) are embodied to be disposed on of the upper surface 511a of light guide plate 510 (or the light guide plates 510a~510d), and the longitudinal sections of the grooves 514a~514f (or the grooves 514a'~514f', the grooves 516a~516d, the grooves 517a~517f, the grooves 518a~518f) are embodied to be V-shaped, in other embodiments of the invention as shown in FIG. 8, the longitudinal sections of a plurality of grooves 519a~519f on a light guide plate 510e can also be U-shaped. Furthermore, in other embodiments of the invention as shown in FIG. 9, the grooves 514' on a light guide plate 510f can be disposed on a lower surface 511b, and these different designs are all technical solutions suitable for the invention and do not depart from the scope of the invention for which protection is sought.

Furthermore, referring again to FIG. 4A, the light source module 500 of the present embodiment of the invention further includes an optical film set 530 and a reflector 540. The optical film set 530 is disposed above the light guide plate 510 for improving the distribution of the light source and allowing more uniformity of the emitted light. Typically, the optical film set can include a prism sheet, a diffusion plate, a collecting sheet, a brightness enhanced film, a protection film, or a combination of the above-described optical films for further optimization of the emitted light. The type and the number of the optical film set 530 are varied in accordance with the actual demands, and embodiments of the invention do not place limits thereon. The reflector 540, of a high reflectivity, is disposed under the light guide plate 510 and reflects the light from the light source 520 to improve the efficiency of the light source 520.

This design of the grooves 514a~514f (or the grooves 514a'~514f', the grooves 516a~516d, the grooves 517a~517f, the grooves 518a~518f, the grooves 519a~519f) on the upper surface 511a of the light guide plate 510 (or the light guide plates 510a~510e) can alleviate the issue of conventional V-grooves having collisions or causing friction with the optical film set 130 above the light guide plate 110 and generating hot spots. Unlike conventional V-grooves having the same length as the length of the light guide plate 110, in the present embodiment of the invention, since the length of the grooves 514a~514f (or the grooves 514a'~514f', the grooves 516a~516d, the grooves 517a~517f, the grooves 518a~518f, the grooves 519a~519f) is smaller than the length of the light guide plate 510 (or the light guide plates 510a~510e), when the light module 500 is being assembled or transported, the grooves 514a~514f (or the grooves 514a'~514f', the grooves 516a~516d, the grooves 517a~517f, the grooves 518a~518f, the grooves 519a~519f) on the light guide plate 510 (or the light guide plates 510a~510e) can effectively reduce the area which can collide or cause friction with the optical film set 530 disposed above the light guide plate 510. Consequently, the light source module 500 can provide a better planar light source for improving the display quality of the display module 300. Similarly, if the groove 514' is disposed on the lower surface 511b of the groove 514' as shown in FIG. 9, then during assembly or transportation of the light source module 500 (referring to FIG. 4A), the groove 514' can also effectively reduce the area which can collide or cause friction with the reflector 540 below the light guide plate 510f (referring to FIG. 4A). Consequently, the light source module 500 can provide a better planar light source for improving the display quality of the display module.

Moreover, in order to improve the brightness performance of the light source module 500, a sandblasting process can be performed on the surfaces of the light guide plate 510 (or the light guide plates 510a-510e), which the grooves 514a~514f (or the grooves 514a'~514f', the grooves 516a~516d, the grooves 517a-517f, the grooves 518a-518f, the grooves 519a-519f, the groove 514') are not formed thereon. Consequently, the lower surface 511b of the light guide plate 510 (or the light guide plates 510a~510e) and the upper surface 511a of the light guide plate 510f are both a surface have a plurality of microstructures thereon. After the light emitted from the light source 520 enters the light guide plate 510, the light is reflected by the uneven lower surface 511b of the light guide plate 510 (or the light guide plates 510a~510e). By using the grooves 514a~514f (or the grooves 514a'~514f', the grooves 516a~516d, the grooves 517a~517f, the grooves 518a~518f, the grooves 519a~519f) to refract the light, and thus the light is made more uniform. Alternatively, the groove 514' on the lower surface 511b of the light guide plate 510f is used to refract the light, and thereby the light is made more uniform. Moreover, by using the uneven upper surface 511a of the light guide plate 510f, light can be more evenly distributed, thereby increasing the emitted luminance of the light emitting region and improving the efficiency of the light source. Hence, a planar light source having uniform brightness is provided.

Figure 10:
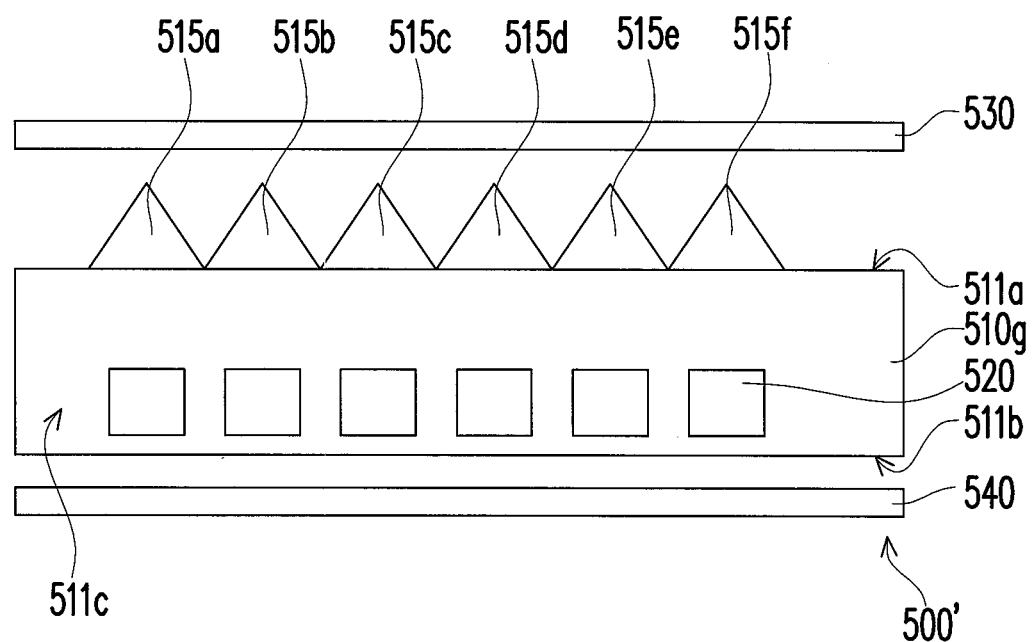
FIG. 10 represents a schematic top view of the light guide plate in accordance with another embodiment of the invention.

It should be noted that in other embodiments of the invention, as shown in FIG. 10, a light guide plate 510g may also not have any grooves, but instead the light guide plate 510g can have a plurality of protruding patterns 515a~515f. These protruding patterns 515a~515f can be disposed on the upper surface or the lower surface of the light guide plate 510g, in which the length of the protruding patterns 515a~515f is smaller than the length of the light guide plate 510g. As aforementioned in the previously described embodiments, in other undrawn embodiments of the invention, the length of the protruding patterns 515a~515f can be completely the same, completely different, or partially the same, the adjacent patterns can be connected to each other or disconnected from each other, the depth or the height of these protruding patterns can be decreasing in a linear manner or in an irregular manner, the longitudinal section has at least one included angle, as well as other characteristics. The light source 520 can be disposed correspondingly on a side of the protruding patterns 515a~515f, or disposed on at least a side of the light guide plate 510g (not drawn in FIG. 10). A person of ordinary skill can arrive at the necessary technical functions by referring to the above-described embodiments and selecting the aforementioned components according to practical needs.

In embodiments of the invention, the light source 520 is disposed on one side of the light guide plate 510. Other embodiments of the invention can dispose the light source 520 on the two opposing sides of the light guide plate 510, where the grooves 514a~514f (or the grooves 514a'~514f', the grooves 516a~516d, the grooves 517a~517f, the grooves 518a~518f, the grooves 519a~519f) or the protruding patterns 515a~515f are extending from the light incident surface 511c of the light guide plate 510 towards the light emitting region 512a, corresponding to the light source 520.

Accordingly, embodiments of the invention provide designs of light guide plates for improving the issue of hot spots being generated during assembly or transport of the light source module due to the light guide plate colliding or causing friction with the optical film set disposed thereabove or the reflector disposed therebelow. Consequently, the quality of the emitted light from the light source module is improved, and the display quality of the display module is enhanced. Moreover, since embodiments of the invention decrease the area for which the light guide plate can collide or cause friction with the optical film set or the reflector, the yield of the light source module is improved, thereby reducing production costs.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A light source module, comprising:
    a light guide plate having an upper surface, a lower surface, a light incident surface, a light emitting region and a periphery region around the light emitting region, the light guide plate having a plurality of grooves disposed on at least one of the upper surface and the lower surface and extending in a direction from the light incident surface towards the light emitting region and crossing the periphery region into the light emitting region, wherein lengths of the grooves are smaller than a length of the light guide plate, and the lengths of extensions for the grooves which disposed on at least one of the upper surface and the lower surface are not all the same; and
    a light source disposed on the light incident surface of the light guide plate, and the grooves of the light guide plate are disposed beside the light incident surface, wherein any two adjacent grooves of the grooves on the same surface of the light guide plate are not connected to each other.

2. The light source module as claimed in claim 1, wherein the grooves are disposed in one of the upper surface or the lower surface of the light guide plate, and another surface of the upper surface and the lower surface is a surface having a plurality of microstructures.

3. The light source module as claimed in claim 1, wherein the light emitting region has a length L, the length of the grooves in the light emitting region is D, and $0<D<\frac{1}{4}L$.

4. The light source module as claimed in claim 1, wherein the length of the periphery region is A, the length of the grooves is d, and $A<d<A+\frac{1}{4}L$.

5. The light source module as claimed in claim 1, wherein a depth or a height of the grooves in the periphery region is larger than a depth or the height of the grooves in the light emitting region.

6. The light source module as claimed in claim 5, wherein the depth or the height of the grooves decreases in a linear manner.

7. The light source module as claimed in claim 5, wherein the depth or the height of the grooves decreases in a nonlinear manner.

8. The light source module as claimed in claim 1, wherein a depth or a height of the grooves changes in different manners.

9. The light source module as claimed in claim 1, wherein longitudinal sections of the grooves are V-shaped or U-shaped.

10. The light source module as claimed in claim 9, wherein included angles of the longitudinal sections of the grooves are not completely the same.

11. The light source as claimed in claim 1, wherein any two adjacent grooves of the grooves are connected to each other.

12. The light source as claimed in claim 1, wherein spacing distances between the grooves are not completely the same.

13. The light source as claimed in claim 1, wherein extending directions of the grooves are parallel to each other.

14. The light source module as claimed in claim 1, further comprising an optical film set disposed above the upper surface of the light guide plate.

15. The light source as claimed in claim 1, wherein the light source comprises a plurality of point light sources, and each point light source is disposed corresponding to one of the grooves.

16. A display module, comprising:
    a display panel; and
    a light source module as claimed in claim 1, disposed on a side of the display panel.

* * * * *